(12) United States Patent
Lee

(10) Patent No.: US 12,528,276 B2
(45) Date of Patent: Jan. 20, 2026

(54) LAMINATION DEVICE AND METHOD OF MANUFACTURING DISPLAY DEVICE USING THE SAME

(71) Applicant: Samsung Display Co., Ltd., Yongin-Si (KR)

(72) Inventor: Jongsuk Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 219 days.

(21) Appl. No.: 18/200,627

(22) Filed: May 23, 2023

(65) Prior Publication Data
US 2024/0092072 A1    Mar. 21, 2024

(30) Foreign Application Priority Data
Sep. 19, 2022    (KR) .......................... 10-2022-0118137

(51) Int. Cl.
*B32B 37/00* (2006.01)
*B32B 37/06* (2006.01)
*B32B 37/10* (2006.01)

(52) U.S. Cl.
CPC .......... *B32B 37/0046* (2013.01); *B32B 37/06* (2013.01); *B32B 37/10* (2013.01); *B32B 2310/0831* (2013.01); *B32B 2457/20* (2013.01)

(58) Field of Classification Search
None
See application file for complete search history.

(56) References Cited

U.S. PATENT DOCUMENTS

| 4,619,804 | A | * | 10/1986 | Leonard | ................ | C03C 23/006 |
| | | | | | | 264/496 |
| 4,965,118 | A | * | 10/1990 | Kodera | ................. | B29C 59/046 |
| | | | | | | 428/137 |
| 6,653,057 | B1 | * | 11/2003 | Koyama | ........... | G11B 11/10584 |

(Continued)

FOREIGN PATENT DOCUMENTS

| CN | 102667893 A | * | 9/2012 | ....... | G02F 1/133331 |
| CN | 104936778 A | * | 9/2015 | ............... | C09J 7/385 |

(Continued)

OTHER PUBLICATIONS

Machine translation JP2000249808A (Year: 2000).*

(Continued)

*Primary Examiner* — Jacob T Minskey
*Assistant Examiner* — Wayne K. Swier
(74) *Attorney, Agent, or Firm* — F. CHAU & ASSOCIATES, LLC

(57) ABSTRACT

A lamination device includes: a stage including a fixing part; a pressing part disposed on the stage; a light source disposed between the stage and the pressing part, and configured to emit light in a direction of the pressing part; and a window fixing chuck overlapping the pressing part, wherein the pressing part includes: a light refraction part disposed adjacent to the light source and refracting, toward the window fixing chuck, the light that was emitted in the direction of the pressing part; and a head part disposed to at least partially surround the light refraction part, and configured to transmit the light that was refracted toward the window fixing chuck, wherein the head part includes a material different from that of the light refraction part.

10 Claims, 10 Drawing Sheets

(56) References Cited

U.S. PATENT DOCUMENTS

| | | | |
|---|---|---|---|
| 11,198,271 B2 | 12/2021 | Kim et al. | |
| 2011/0146893 A1* | 6/2011 | Marty | B29D 11/0073 |
| | | | 156/212 |
| 2022/0118731 A1 | 4/2022 | Shin et al. | |

FOREIGN PATENT DOCUMENTS

| | | |
|---|---|---|
| JP | 2000249808 A * | 9/2000 |
| KR | 10-1046828 | 7/2011 |
| KR | 10-1470445 | 12/2014 |
| KR | 10-2240337 | 4/2021 |
| KR | 10-2022-0050299 | 4/2022 |

OTHER PUBLICATIONS

Merriam-Webster Dictionary https://www.merriam-webster.com/dictionary/diaphragm (Year: 2020).*
Machine translation KR102240337B1 (Year: 2021).*
Machine translation CN102667893A (Year: 2012).*
Machine translation CN104936778A (Year: 2015).*

* cited by examiner

LAMINATION DEVICE AND METHOD OF MANUFACTURING DISPLAY DEVICE USING THE SAME

CROSS-REFERENCE TO RELATED APPLICATION

This U.S. non-provisional patent application claims priority under 35 U.S.C. § 119 of Korean Patent Application No. 10-2022-0118137, filed on Sep. 19, 2022, the disclosure of which is incorporated by reference herein in its entirety.

TECHNICAL FIELD

The present invention relates to a lamination device, and a method of manufacturing a display device using the lamination device, and more particularly, to a lamination device including a pressing part and a light emitting part, and a method of manufacturing a display device using the lamination device.

DISCUSSION OF THE RELATED ART

In general, a cover window for protecting a display panel is attached to a front surface of the display panel. In this case, typically, a binder is interposed between the display panel and the cover window to laminate the display panel and the cover window to each other.

Research is being conducted on a lamination device for performing a process of laminating a display panel and a window, and a manufacturing method using the same.

SUMMARY

According to an embodiment of the present invention, a lamination device includes: a stage including a fixing part; a pressing part disposed on the stage; a light source disposed between the stage and the pressing part, and configured to emit light in a direction of the pressing part; and a window fixing chuck overlapping the pressing part, wherein the pressing part includes: a light refraction part disposed adjacent to the light source and refracting, toward the window fixing chuck, the light that was emitted in the direction of the pressing part; and a head part disposed to at least partially surround the light refraction part, and configured to transmit the light that was refracted toward the window fixing chuck, wherein the head part includes a material different from that of the light refraction part.

In an embodiment of the present invention, the light has a central wavelength of about 200 nm to about 400 nm.

In an embodiment of the present invention, the head part includes silicone.

In an embodiment of the present invention, the light refraction part includes glass.

In an embodiment of the present invention, the light refraction part has a flat shape, a concave lens shape, a convex lens shape, or a Fresnel lens shape.

In an embodiment of the present invention, the head part is a diaphragm.

According to an embodiment of the present invention, a method for manufacturing a display device using a lamination device, the method includes: providing a target panel including a display panel and a guide film disposed on the display panel; fixing the target panel with a fixing part of the lamination device so that the display panel faces a window fixing chuck of the lamination device; disposing a window in the window fixing chuck; disposing the target panel on the window by moving a pressing part of the lamination device, on which the target panel is disposed, toward the window fixing chuck; pressing the target panel with the pressing part toward the window; emitting light toward the guide film by a light source of the lamination device after pressing the target panel with the pressing part toward the window; and removing the pressing part from the window fixing chuck.

In an embodiment of the present invention, the emitting of light toward the guide film by the light source includes: refracting the light emitted from the light source while passing through a light refraction part of the pressing part, wherein the refracted light passes through a head part of the pressing part; and irradiating the guide film with the light passing through the head part.

In an embodiment of the present invention, the guide film includes a first part and second parts, wherein the first part is adjacent to the display panel and has a portion contacting the display panel, wherein the second parts are spaced apart from each other with the first part therebetween, and the irradiating of the guide film with the light passing through the head part includes irradiating the first part with the light passing through the head part.

In an embodiment of the present invention, the emitting of the light toward the guide film by the light source includes curing the guide film with the light, and the removing of the pressing part from the window fixing chuck includes removing the cured guide film from the display panel.

In an embodiment of the present invention, the emitting of the light toward the guide film by the light source includes: heating a head part of the pressing part with the light; and providing a heat to a region between the display panel and the window by the heated head part.

In an embodiment of the present invention, the light has a central wavelength of about 200 nm to about 400 nm.

In an embodiment of the present invention, a head part of the pressing part is a diaphragm.

In an embodiment of the present invention, a head part of the pressing part includes silicone.

In an embodiment of the present invention, a light refraction part of the pressing part includes glass.

In an embodiment of the present invention, a light refraction part of the pressing part has a flat shape, a concave lens shape, a convex lens shape, or a Fresnel lens shape.

According to an embodiment of the present invention, a lamination device includes: a fixing part configured to fix a guide film, a pressing part disposed below the fixing part and the guide film; a roller part disposed on the pressing part; a light source disposed on the pressing part; and a window fixing chuck overlapping the pressing part, wherein the pressing part includes: a light refraction part refracting light emitted from the light source toward the window fixing chuck; and a head part covering the light refraction part and transmitting the refracted light.

In an embodiment of the present invention, the light emitted from the light source has a central wavelength of about 200 nm to about 400 nm.

In an embodiment of the present invention, the head part may be configured to extend into the window fixing chuck.

In an embodiment of the present invention, the light refraction part has a flat shape, a concave lens shape, a convex lens shape, or a Fresnel lens shape.

BRIEF DESCRIPTION OF THE DRAWINGS

The above and other features of the present invention will become apparent by describing in detail embodiments thereof with reference to the accompanying drawings, in which.

DETAILED DESCRIPTION OF THE EMBODIMENTS

Figure 1:
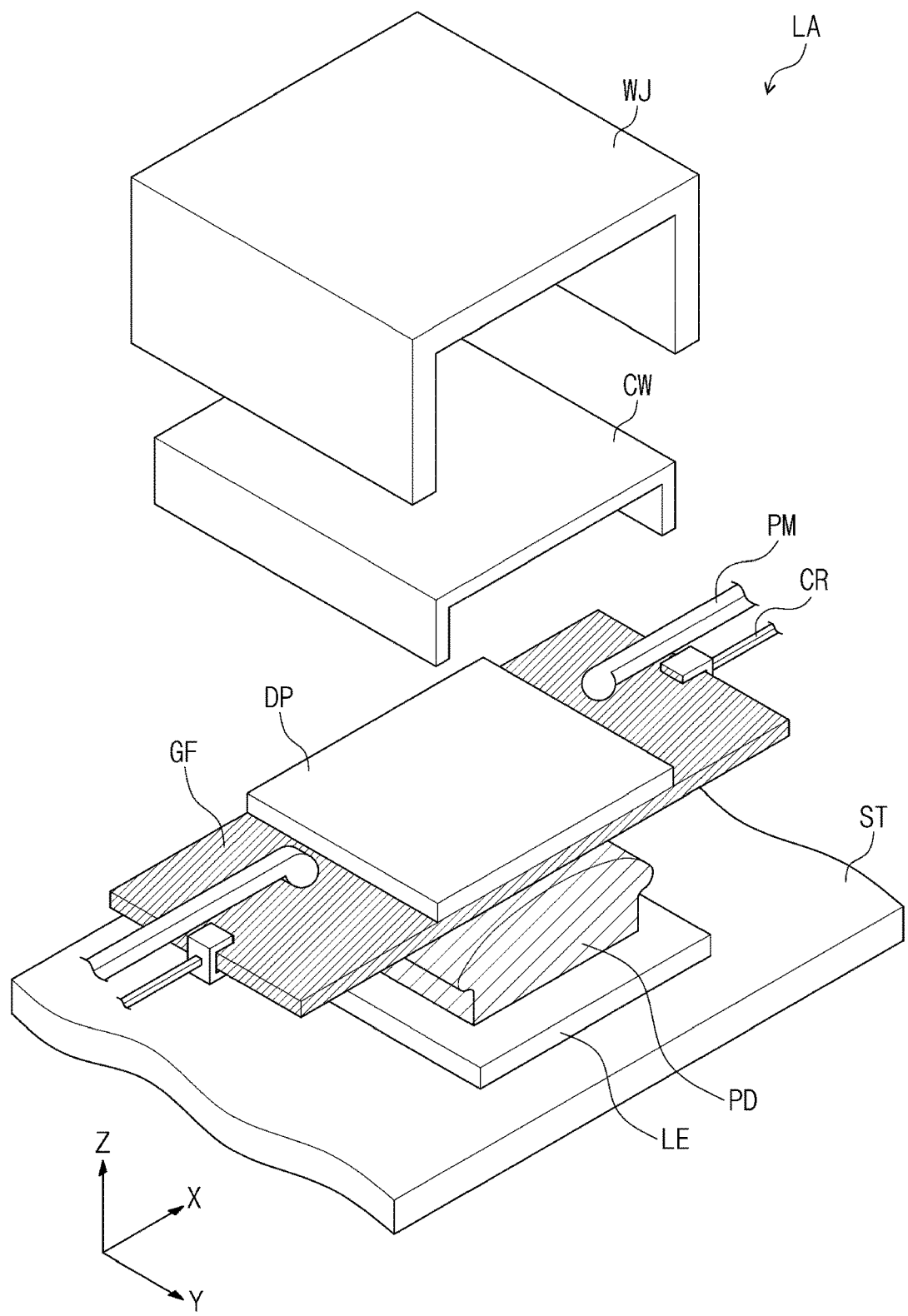
FIG. 1 is an exploded perspective view illustrating a lamination device according to an embodiment of the present invention.

The present invention may have various modifications and may have various forms, and thus embodiments are illustrated in the drawings and described in detail here below. However, the disclosed embodiments are not intended to limit the present invention to a specific disclosed form, the present invention should be understood to include all modifications, equivalents and substitutes.

It will be understood that when an element (or region, layer, portion) is referred to as being "on", "connected to" or "coupled to" another element or layer, it can be directly on, connected or coupled to the other element (or region, layer, portion) or intervening elements or layers may be present.

In addition, in this specification "directly disposed" may mean that there is no intervening layer, film, region, or plate between portions of a layer, film, region, or plate and another portion. For example, "directly disposed" may mean disposing between two layers or two members without using an additional member such as an adhesive member.

Like reference numerals or symbols refer to like elements throughout the specification. The thickness, the ratio and the dimension of the element may be exaggerated for effective description of the technical contents.

As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be necessarily limited by these terms. These terms are only used to distinguish one element, component, region, layer or section from another region, layer or section. Thus, a first element, component, region, layer or section discussed below could be termed a second element, component, region, layer or section without departing from the spirit and scope of the present inventive concept. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, a lamination device according to an embodiment of the present invention and a display device using the same will be described with reference to the accompanying drawings.

Figure 2:
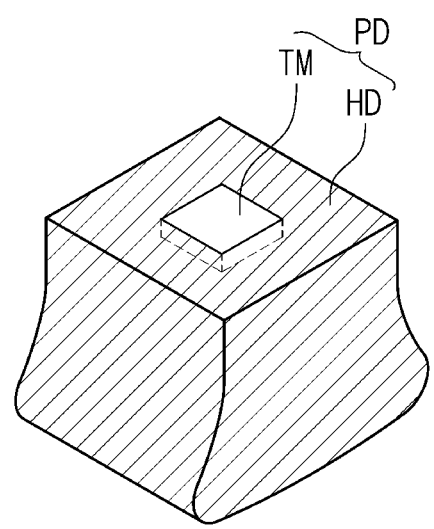
FIG. 2 is a perspective view illustrating a pressing part included in a lamination device according to an embodiment of the present invention.

FIG. 1 is an exploded perspective view illustrating a lamination device according to an embodiment of the present invention. FIG. 2 is a perspective view illustrating a pressing part included in a lamination device according to an embodiment of the present invention.

Referring to FIG. 1 and FIG. 2, a lamination device LA according to an embodiment of the present invention includes a stage ST, a pressing part PD, a light source LE, and a window fixing chuck WJ.

The stage ST may have a plane defined by a X axis direction X and a Y axis direction Y crossing the X axis direction X. The stage ST may be a member supporting the light source LE and the pressing part PD. For example, a stage or a part of a stage may be disposed below the light source LE and the pressing part PD.

The stage ST may include a fixing part CR. The fixing part CR may fix a target panel that includes a display panel DP and a guide film GF. For example, the fixing part CR may include clamps that may be attached to extending portions that extend in the X axis direction X. For example, the clamps of the fixing part CR may hold the guide film GF. The fixing part CR may dispose the target panel between the pressing part PD and the window fixing chuck WJ. For example, the target panel may be disposed, by the fixing part CR, between the pressing part PD and the window fixing chuck WJ in a Z axis direction Z. Herein, the Z axis direction Z may be a direction substantially perpendicular to the plane defined by the X axis direction X and the Y axis direction Y. Hereinafter, in this specification, up, above, down, upper direction, and lower direction may be relative positions and directions of components with respect to the Z axis direction Z.

The stage ST may further include a roller part PM. The roller part PM may press and bend the guide film GF toward a pad part. For example, the roller part PM may include a circular head attached to an extending portion that extends in the X axis direction X. In a process of bending the guide film GF, the display panel DP disposed on the guide film GF may also be bent. Accordingly, in a process of laminating the display panel DP and a window CW, the display panel DP may be inserted into the window CW in a bent state.

The light source LE may be disposed on the stage ST. The light source LE may be disposed between the stage ST and the pressing part PD. The light source LE may have a bar shape or a polygonal shape (e.g., a rectangular shape). However, this is illustrated as an example, and the shape of the light source LE is not limited thereto.

The light source LE may emit light toward the pressing part PD. The light emitted from the light source LE may be ultraviolet (UV) light. For example, the light emitted from the light source LE may have a central wavelength of about 200 nm to about 400 nm.

The light source LE may emit light having an intensity sufficient to cure the guide film GF. For example, the light source LE may emit light of about 2000 mJ or more capable of curing the guide film GF.

The pressing part PD may be disposed on the stage ST. For example, the pressing part PD is fixed on the stage ST, and the pressing part PD may move toward and away from the window fixing chuck WJ when the stage ST is raised or lowered. However, this is illustrated by way of example, an embodiment of the present invention is not limited thereto. For example, in a state in which the stage ST is fixed, only the pressing part PD extends from the stage ST in the Z axis direction Z and may move toward the window fixing chuck WJ.

Referring to FIG. 1 and FIG. 2, the pressing part PD may have a convex surface that faces the window fixing chuck WJ. In addition, the pressing part PD may include a light refraction part TM, which is disposed adjacent to the stage ST, and a head part HD that is disposed to at least partially surround the light refraction part TM.

The light refraction part TM may be a part that refracts light. For example, the light refraction part TM may refract light, which is emitted from the light source LE, toward the guide film GF. For example, the light refraction part TM may refract most of the light emitted from the light source LE to cause the light to propagate in the Z axis direction Z. Accordingly, it is possible to prevent the light emitted from the light source LE from being dispersed and causing a decrease in process efficiency. It is also possible to prevent the light emitted from the light source LE from being emitted to the outside of the lamination device LA and reaching a user of the lamination device LA.

The light refraction part TM may be disposed in the head part HD. The light refraction part TM may have a rectangular parallelepiped shape. However, this is merely illustrated by way of example, and the shape and/or size of the light refraction part TM is not limited thereto. For example, the light refraction part TM may have a convex lens shape, a concave lens shape, or a Fresnel lens shape. The light refraction part TM may include a material different from that of the head part HD. The light refraction part TM may include glass.

The head part HD has elasticity and may be at least partially deformable. In addition, the head part HD may include a material which allows UV light to pass therethrough. For example, the head part HD may be formed of an elastic material which allows UV light to pass therethrough. For example, the head part HD may include a UV mold type silicone material. However, this is illustrated by way of example and a material for the head part HD is not limited thereto. Any material, which has elasticity and excellent UV light transmittance, may be used as a material for the head part HD.

For example, the head part HD may have a convex surface.

In addition, the head part HD may be expanded to laminate the window CW and the display panel DP. For example, the head part HD may be a diaphragm.

The window fixing chuck WJ may be disposed on the pressing part PD. The window fixing chuck WJ may be disposed above the pressing part PD in the Z axis direction Z. For example, the window fixing chuck WJ may overlap the pressing part PD in the Z axis direction Z. The window CW may be fixed to the window fixing chuck WJ.

The window fixing chuck WJ may fix the window CW on the inside of the window fixing chuck WJ. The shape of the window fixing chuck WJ may correspond to the shape of the window CW. For example, the window fixing chuck WJ may have a square or rectangular U-shape. The window fixing chuck WJ may include a space in which the window CW, which is fixed inside the space, is laminated with the display panel DP by the pressing part PD. For example, the pressing part PD may be inserted into the space of the window fixing chuck WJ.

The lamination device LA according to an embodiment of the present invention may further include a temperature sensing unit. The temperature sensing unit may be used to measure the temperature of the pressing part PD which is heated by the light source LE. The lamination device LA according to an embodiment of the present invention includes the temperature sensing unit, so that the temperature of the pressing part PD may be measured and adjusted in real time.

Hereinafter, the window CW, the display panel DP, and the guide film GF which are laminated by the lamination device LA will be described.

The display panel DP might not be directly disposed on the pressing part PD, but may be disposed on the pressing part PD through the guide film GF. For example, the guide film GF may be disposed between the display panel DP and the pressing part PD. In addition, the display panel DP might not be directly fixed in its position by the fixing part CR but may be fixed by the guide film GF.

The guide film GF may include a flexible plastic material. For example, the guide film GF may include a plastic material such as polyimide (PI) or polyethyleneterephthalate (PET).

For example, the display panel DP may be a flexible display panel. The display panel DP according to an embodiment of the present invention, may be a light emitting display panel, but the present invention is not limited thereto. For example, the display panel DP may be an organic light emitting display panel or a quantum dot light emitting display panel. A light emitting layer of the organic light emitting display panel may include an organic light emitting material. A light emitting layer of the quantum dot display panel may include quantum dots or quantum rods and the like. Hereinafter, the display panel DP is described as an organic light emitting display panel.

The window CW may be disposed on the display panel DP. The window CW may include glass. For example, the window CW may include a synthetic resin film in addition to glass. In addition, the window CW may have a multi-layer structure or a single-layer structure. For example, the window CW may include a plurality of synthetic resin films bonded to each other with an adhesive, or a glass substrate and a synthetic resin film which are bonded to each other with an adhesive.

An adhesive may be disposed between the display panel DP and the window CW. An adhesive may include an optically clear adhesive (OCA) but, the type of an adhesive is not limited thereto.

For example, an adhesive may be first disposed on the top surface of the display panel DP. After an adhesive is attached on the top surface of the display panel DP, the window CW may be attached to the adhesive. The display panel DP and the window CW may be laminated to each other via the adhesive. To laminate the display panel DP and the window CW to each other, the lamination device LA illustrated in FIG. 1 may be used.

After the display panel DP and the window CW are laminated to each other, the guide film GF may be removed from the display panel DP. An adhesive, which is for attaching the guide film GF to the display panel DP, may be disposed between the guide film GF and the display panel DP. The window CW, which is laminated to the display panel DP, may protect the display panel DP from external scratches and impacts.

An input sensing unit, which is for sensing an external input, and an anti-reflection layer, which is for preventing reflection of external light, may be disposed between the display panel DP and the window CW.

Hereinafter, referring to FIGS. 3 to 11, a method of manufacturing a display device according to an embodiment of the present invention will be described in detail. Hereinafter, the features of the lamination device will not be described again, to prevent redundant descriptions, and a method of manufacturing a display device will be described in detail.

Figure 3:
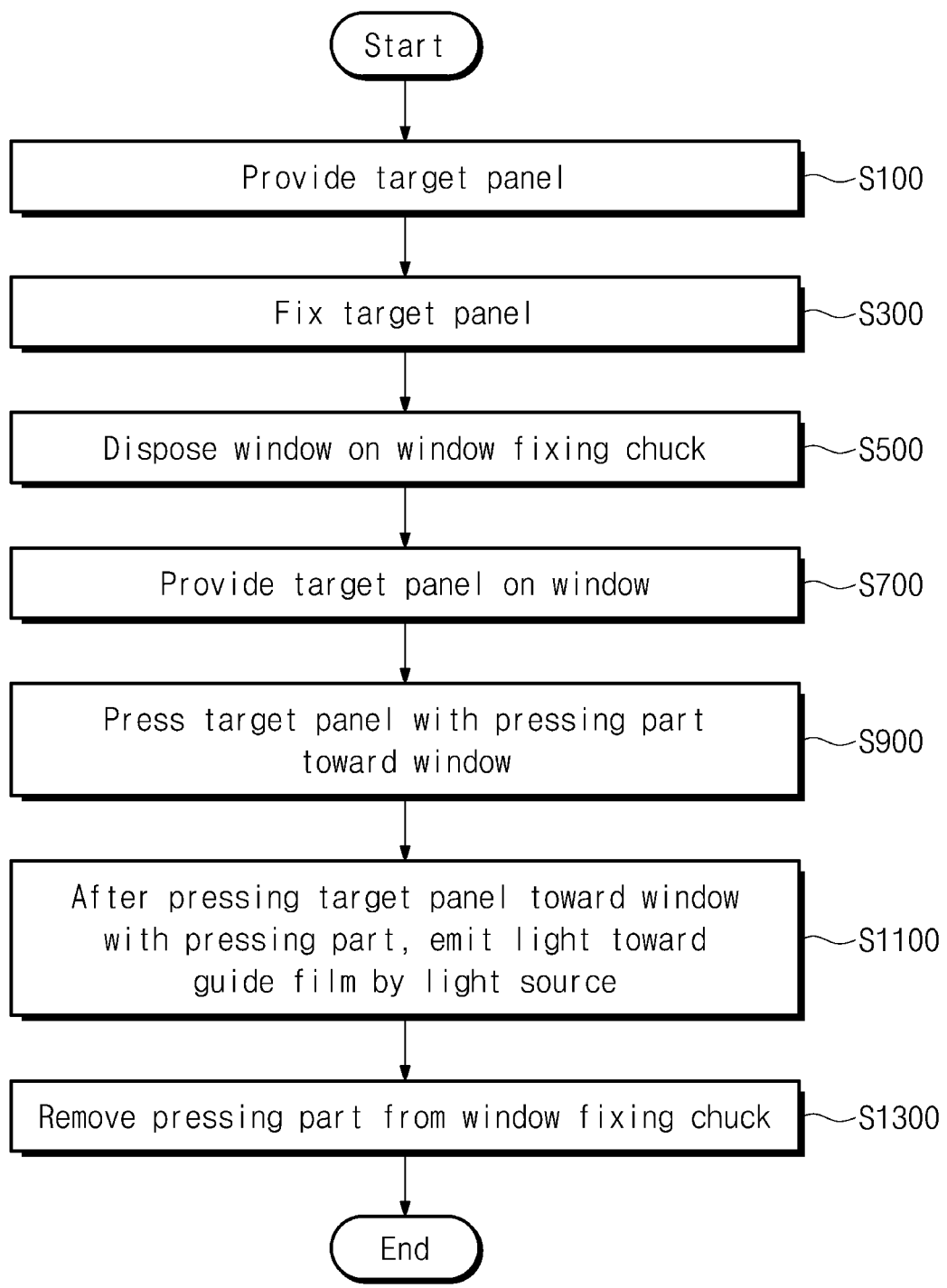
FIG. 3 is a flowchart illustrating a method of manufacturing a display device according to an embodiment of the present invention.
Figure 4:
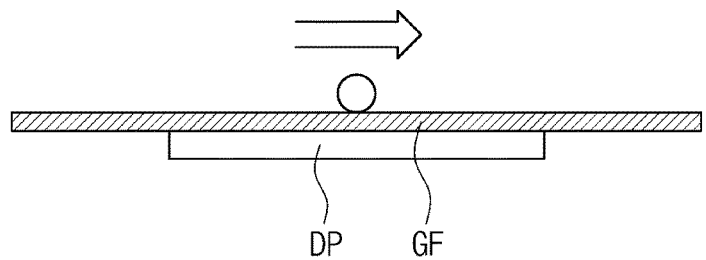
FIG. 4 is a schematic view illustrating an operation of a method of manufacturing a display device according to an embodiment of the present invention.
Figure 5:
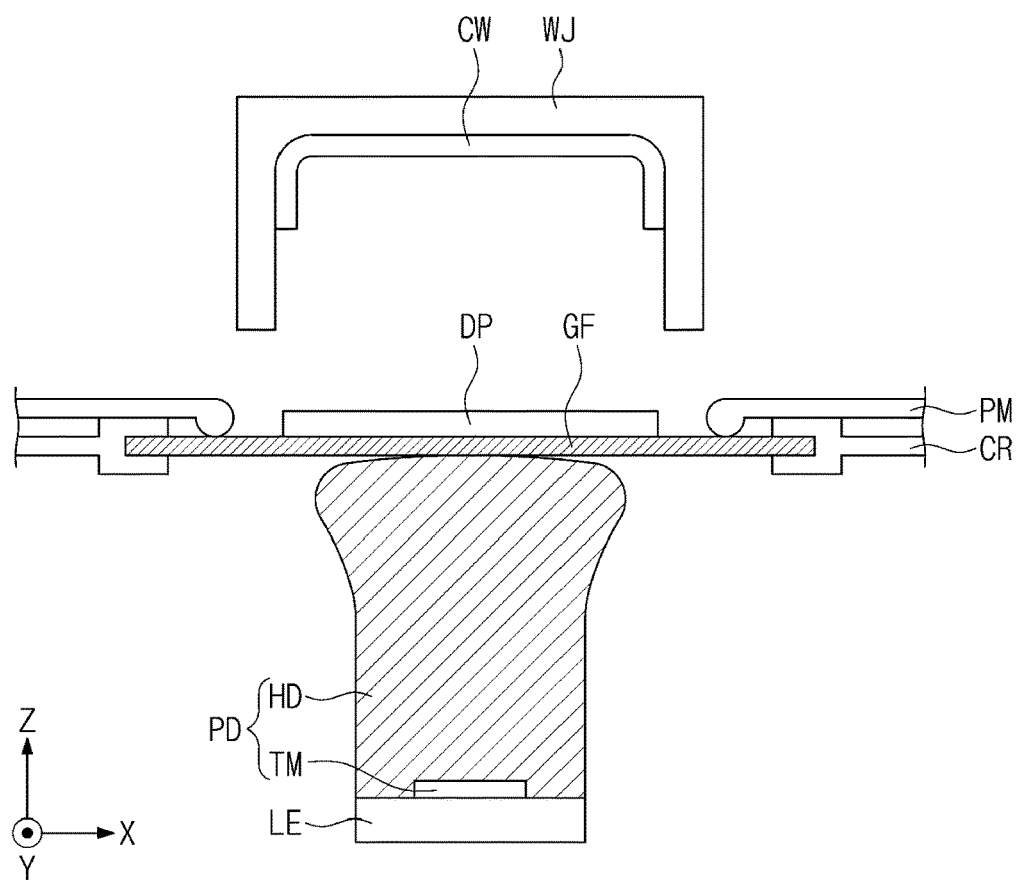
FIG. 5 is a schematic view illustrating an operation of a method of manufacturing a display device according to an embodiment of the present invention.
Figure 6:
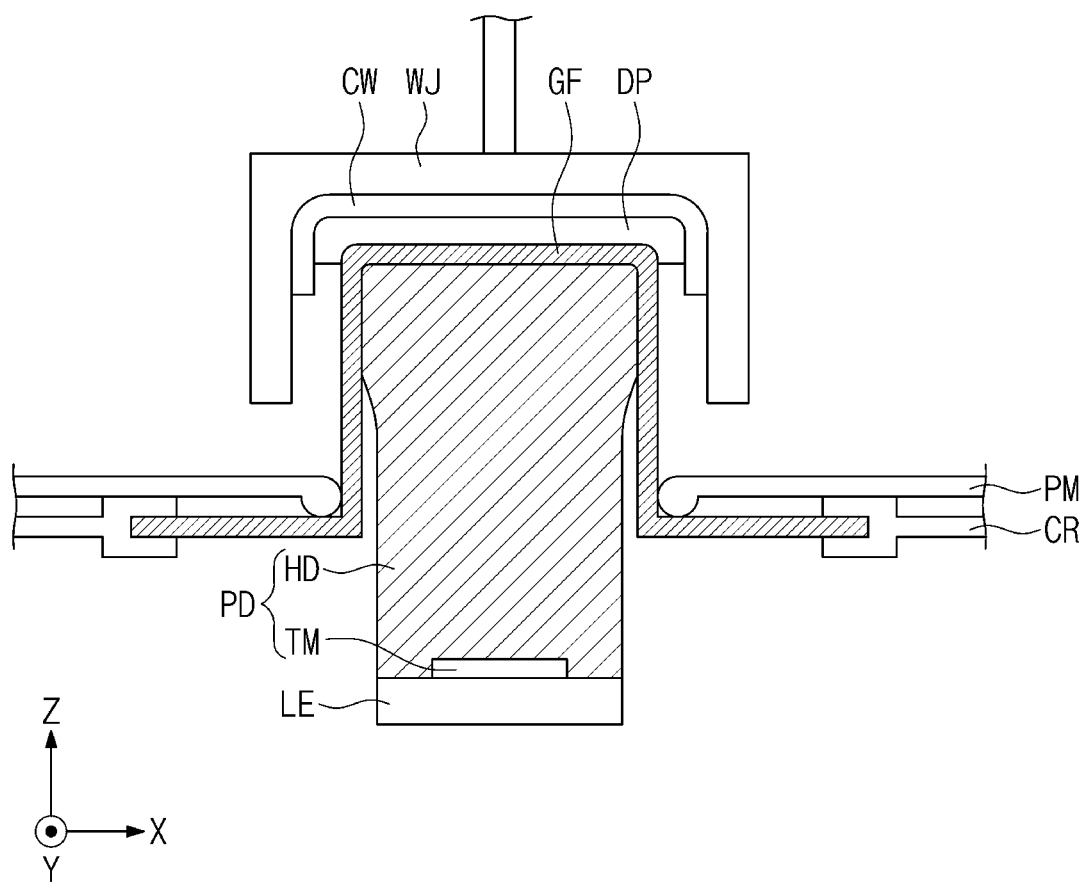
FIG. 6 is a schematic view illustrating an operation of a method of manufacturing a display device according to an embodiment of the present invention of the present invention.
Figure 7:
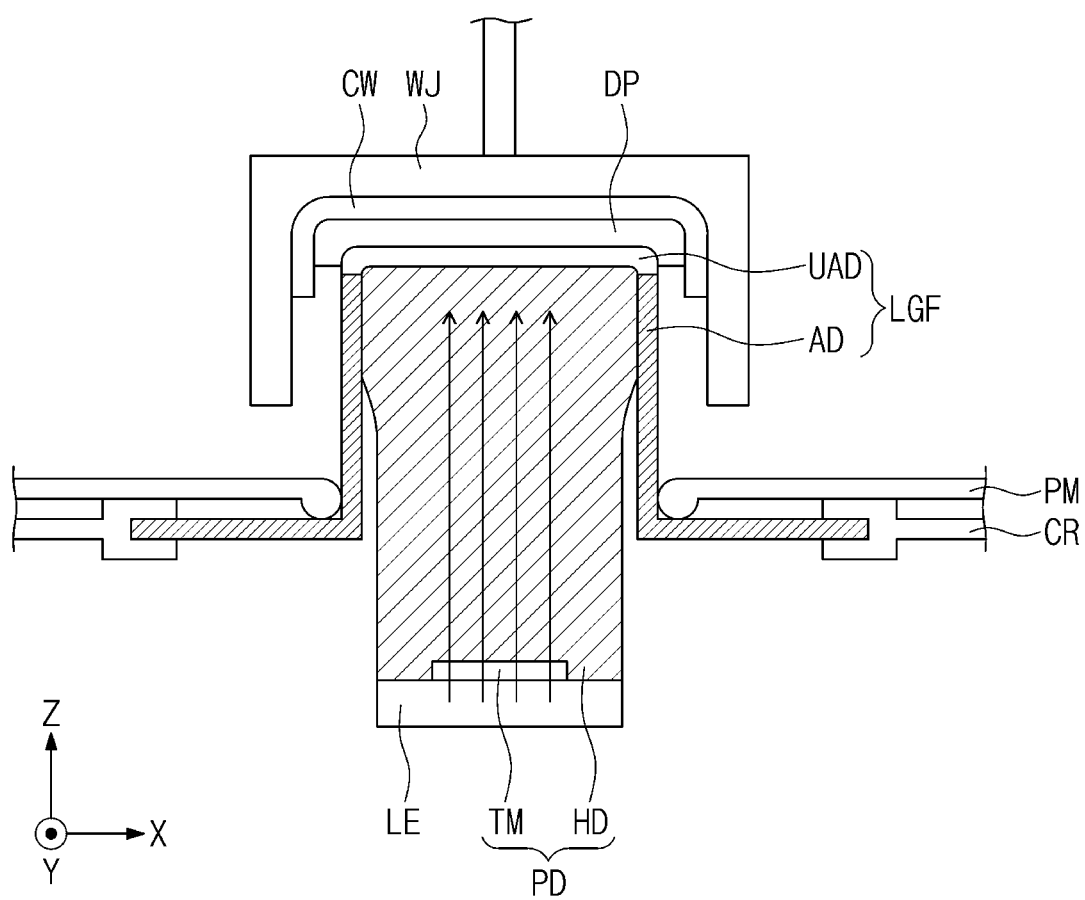
FIG. 7 is a schematic view illustrating an operation of a method of manufacturing a display device according to an embodiment of the present invention.
Figure 8:
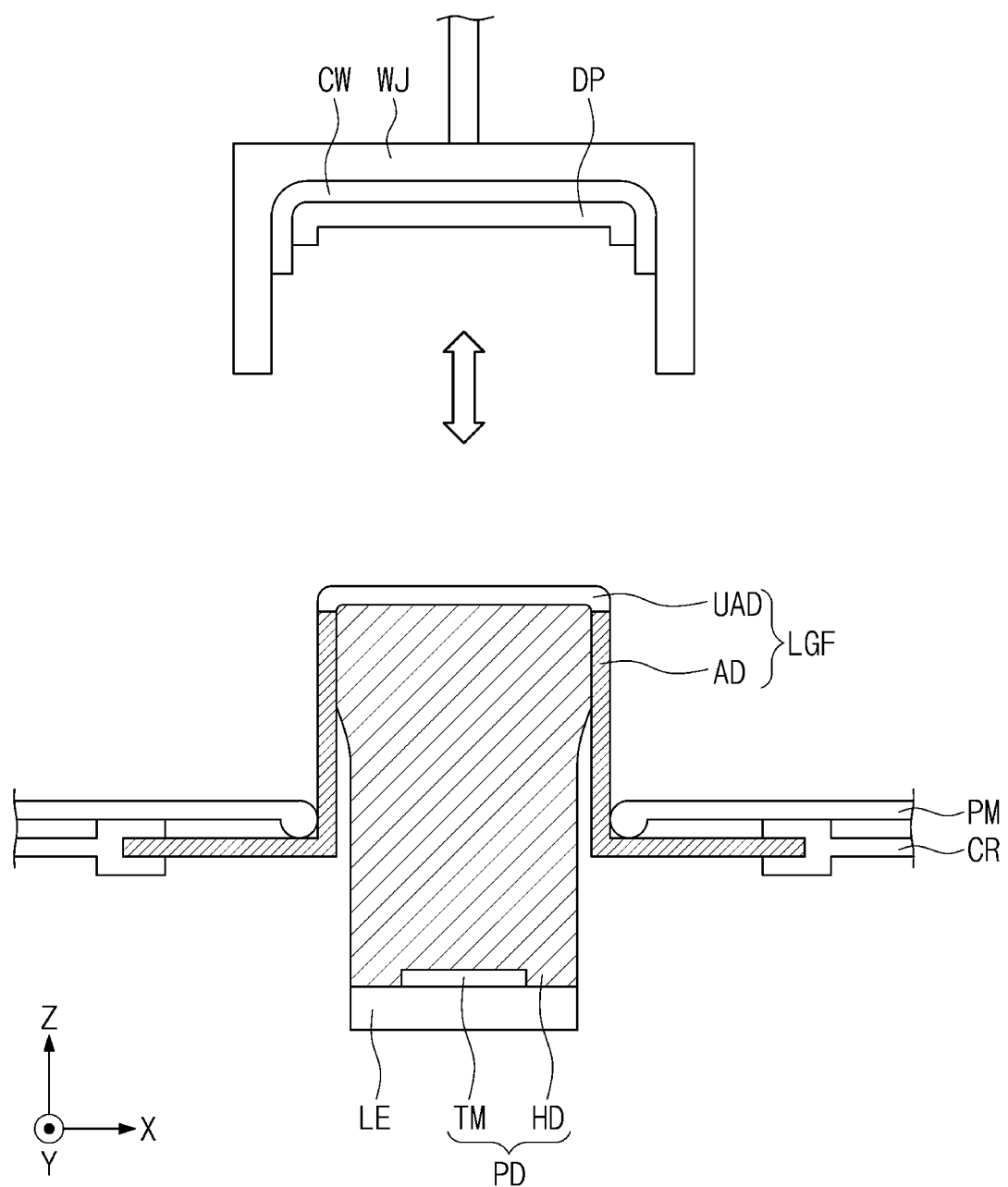
FIG. 8 is a schematic view illustrating an operation of a method of manufacturing a display device according to an embodiment of the present invention.

FIG. 3 is a flowchart of a method of manufacturing a display panel according to an embodiment of the present invention. FIG. 4 schematically illustrates an operation of the method of manufacturing a display panel according to an embodiment of the present invention. FIG. 5 schematically illustrates an operation of the method of manufacturing a display panel according to an embodiment of the present invention. FIG. 6 schematically illustrates an operation of the method of manufacturing a display panel according to an embodiment of the present invention. FIG. 7 schematically illustrates an operation of the method of manufacturing a display panel according to an embodiment of the present invention. FIG. 8 schematically illustrates an operation of the method of manufacturing a display panel according to an embodiment of the present invention.

Referring to FIG. 3, the method of manufacturing a display device according to an embodiment of the present invention may include providing a target panel including a display panel and a guide film disposed on the display panel (S100). The method further includes fixing the target panel to a position with a panel fixing part so that the display panel faces a window fixing chuck (S300). The method additional includes disposing a window on the window fixing chuck (S500), and providing the target panel on the window by moving a pressing part on which the target panel is disposed toward the window fixing chuck (S700). In addition, the method includes pressing the target panel with the pressing part toward window (S900), and emitting, after pressing the target panel with the pressing part toward window, light toward the guide film by a light source (S1100). The method further includes removing the pressing part from the window fixing chuck (S1300).

FIG. 4 schematically illustrates an operation of providing a target panel including a guide film that is disposed on a display panel (S100). Referring to FIG. 4, the operation of providing the target panel (S100) may include an operation of providing the guide film GF on the display panel DP.

The operation of providing the target panel (S100) may include, after disposing the guide film GF on the display panel DP, an operation of bonding the display panel DP and the guide film GF to each other by using a roller. For example, after the guide film GF is disposed on the display panel DP, the display panel DP and the guide film GF may be laminated to each other by moving the roller in a X axis direction X.

For example, the operation of bonding the display panel DP and the guide film GF to each other may include an operation of disposing the guide film GF directly on the display panel DP by including an adhesive ingredient in the guide film GF. However, this is merely an example and an embodiment of the present invention is not limited thereto. For example, the operation of bonding the display panel DP and the guide film GF may include an operation of providing an adhesive layer on the display panel DP and an operation of providing the guide film GF on the adhesive layer.

FIG. 5 schematically illustrates an operation of fixing the target panel and an operation of disposing the window on the window fixing chuck. Referring to FIG. 5, the operation of fixing the target panel (S300) may include an operation of fixing the target panel to a position with the fixing part CR. The fixing of the target panel with the fixing part CR may be performed by fixing the guide film GF to a position with the fixing part CR. Since the display panel DP is bonded with the guide film GF, the display panel DP may be fixed on the guide film GF which is fixed by the fixing part CR. Accordingly, by the fixing part CR, the target panel including the guide film GF and the display panel DP may be fixed between the pressing part PD and the window fixing chuck WJ.

The fixing of the target panel with the fixing part CR may be fixing the target panel such that the display panel DP is more adjacent to the window fixing chuck WJ than the guide film GF is. In addition, the fixing of the target panel with a fixing part CR may be fixing the target panel such that the guide film GF is more adjacent to the pressing part PD than the display panel DP is. Accordingly, the light source LE, the pressing part PD, the guide film GF, the display panel DP, and the window fixing chuck WJ may be sequentially arranged in the Z axis direction Z.

In addition, the operation of fixing the target panel (S300) may further include an operation of pressing the guide film GF with a roller part PM toward the pressing part PD. When the roller part PM presses the guide film GF toward the pressing part PD, the guide film GF and the display panel DP may be curved in a shape such that the guide film GF and the display panel DP may be disposed on the inside of a cover window CW. However, this is merely an example and an embodiment of the present invention is not limited thereto. For example, in an embodiment of the present invention, the operation of pressing the guide film GF with the roller part PM toward the pressing part PD may be omitted, and in the operation of disposing the target panel on the window (S700), the guide film GF and the display panel DP may be bent, by moving the pressing part PD or the window fixing chuck WJ, in a shape such that the guide film GF and the display panel DP may be disposed on the inside of a cover window CW.

In this specification, an inside may be a region which is adjacent to a center when a portion, on which the pressing part PD is disposed, is set as the center on a plane defined by the X axis direction X and the Y axis direction Y in the drawing. For example, with respect to the window CW, the window fixing chuck WJ may be disposed on the outside, and with respect to the window fixing chuck WJ, the window CW may be disposed on the inside.

The operation of disposing the window on the window fixing chuck (S500) may include disposing the window CW on the inside of the window fixing chuck WJ. By disposing the window CW on the window fixing chuck WJ, the window CW may be disposed more adjacent to the display panel DP than the window fixing chuck WJ is. Accordingly, the light source LE, the pressing part PD, the guide film GF, the display panel DP, the window CW and the window fixing chuck WJ may be sequentially arranged in the Z axis direction Z.

FIG. 6 schematically illustrates an operation of disposing the target panel on the window according to an embodiment of the present invention and the operation of pressing the target panel toward the window according to an embodiment of the present invention. Referring to FIG. 6, the operation of disposing the target panel on the window (S700) may include an operation of moving the pressing part PD toward the window fixing chuck WJ. However, this is merely an example and an embodiment of the present invention is not limited thereto. For example, the operation of disposing the target panel on the window (S700) may include both the operation of moving the pressing part PD toward the window fixing chuck WJ and an operation of moving the window fixing chuck WJ toward the pressing part PD.

The disposing of the target panel on the window (S700) may be directly disposing the display panel DP on the window CW. In addition, even though it is illustrated in FIG. 6 that the window CW is directly disposed on the display panel DP, an embodiment of the present invention is not limited thereto. For example, an adhesive layer may be disposed between the display panel DP and the window CW.

A guide film GF may be disposed on the inside of the window fixing chuck WJ by moving the pressing part PD into the guide film GF. The guide film GF may be disposed on the inside of the window CW. The guide film GF may be disposed on the display panel DP.

The pressing of the target panel with the pressing part toward the window (S900) according to an embodiment of the present invention may include pressing the target panel with a head part HD toward the window CW. Since the head part HD moves in a direction toward the window CW to press the display panel DP toward the window CW, the display panel DP and the window CW may be laminated to each other. In addition, the head part HD may expand to press the display panel DP toward the window CW. For example, the head part HD may be a diaphragm.

FIG. 7 schematically illustrates an operation of emitting light toward the guide film by the light source according to an embodiment of the present invention. Referring to FIG. 7, the operation of emitting light toward the guide film GF (see FIG. 6) by the light source (S1100) may include the operation of curing the guide film GF (see FIG. 6) by the light emitted from the light source LE.

The light emitted from the light source LE may irradiate a first part UAD. The first part UAD may be a part that is more adjacent to the display panel DP than second parts AD. The second parts AD may be disposed to be spaced apart from each other with the first part UAD therebetween. The first part UAD may include a portion contacting the display panel DP. The first part UAD may be a part having reduced adhesion.

A cured guide film LGF may include the first part UAD and the second parts AD. The first part UAD may be cured by the light emitted from the light source LE, and the second parts AD might not be cured. The operation of emitting light toward the guide film GF by the light source LE (S1100) may include an operation of refracting the light while passing through a light refraction part TM, an operation of causing the refracted light to pass through the head part HD, and irradiating the guide film with the light passing through the head part HD.

The operation of emitting light toward the guide film GF (see FIG. 6) by the light source LE (Si 100) may be performed after the operation of pressing the target panel with the pressing part PD toward the window CW. When the operation of emitting light toward the guide film GF (see FIG. 6) by the light source LE (S1100) is performed before the operation of pressing the target panel with the pressing part PD toward the window CW, lamination reliability between the display panel DP and the window CW may deteriorate due to a lifting phenomenon between the cured guide film LGF and the display panel DP, even with pressing being applied by the head part HD. That is, since the operation of emitting light toward the guide film GF (see FIG. 6) by the light source LE (S1100) is performed after the operation of pressing the target panel with the pressing part PD toward the window CW (S900), lamination reliability between the display panel DP and the window CW may be further increased than the case of performing the operation of emitting light toward the guide film GF by the light source LE before the operation of pressing the target panel with the pressing part PD toward the window CW.

In addition, the operation of emitting light toward the guide film GF (see FIG. 6) by the light source LE (S1100) may include an operation of heating the head part HD with the light, and an operation of providing, by the heated head part HD, heat to a region between the display panel DP and the window CW. For example, the head part HD may be heated to a temperature of about 50° C. to about 70° C. Accordingly, lamination reliability between the display panel DP and the window CW may be increased. For example, the size of initial bubbles formed between the display panel DP and a lamination surface of the window CW may be reduced. In addition, since the method of manufacturing a display device according to an embodiment of the present invention includes the operation of heating the head part HD with the light emitted from the light source LE, it is not necessary to include a heat-providing part as a separate component thereby simplifying manufacturing equipment and increasing process efficiency.

FIG. 8 schematically illustrates an operation of removing the pressing part from the window fixing chuck (S1300) according to an embodiment of the present invention. Referring to FIG. 8, the operation of removing the pressing part PD from the window fixing chuck WJ may include the operation of removing the cured guide film LGF from the display panel DP. For example, the cured guide film LGF and the display panel DP may be in a detachable state. In addition, the adhesion between the cured guide film LGF and the head part HD may be maintained. As a result, when the pressing part PD is removed from the window fixing chuck WJ, the guide film LGF may be also removed with the pressing part PD from the window fixing chuck WJ. Accordingly, the method of manufacturing a display device does not need an additional process of removing the guide film GF, after removing the pressing part PD from the window fixing chuck WJ thereby having the effect of simplifying a process.

Hereinafter, a method of manufacturing a display device according to an embodiment of the present invention will be described with reference to FIGS. 9 to 11. In the description of the method of manufacturing a display device, duplicated content with what has already been described with reference to FIGS. 3 to 8 may be omitted or briefly discussed, and the following description will mainly focus on differences.

Unlike the method of manufacturing a display device described with reference to FIGS. 3 to 8, FIGS. 9 to 11 each have a difference in terms of the shape of a light reflection part.

Figure 9:
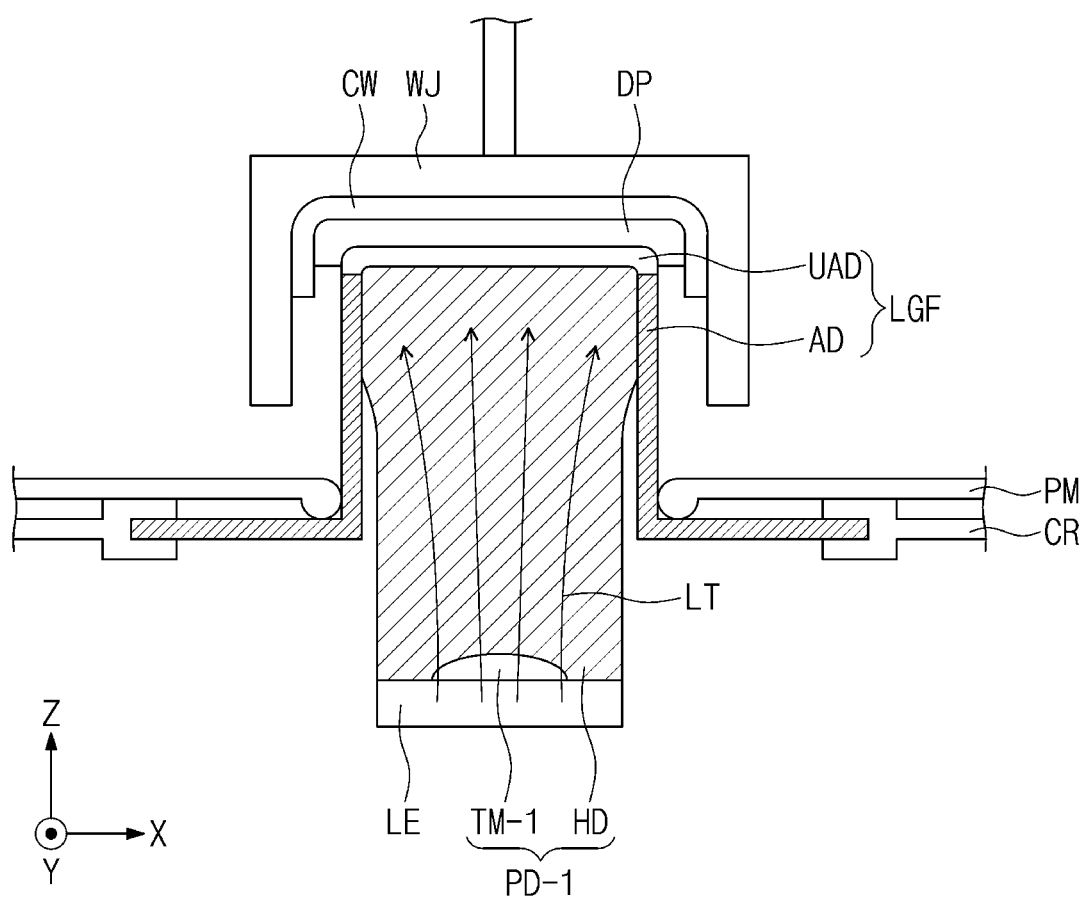
FIG. 9 is a schematic view illustrating an operation of a method of manufacturing a display device according to an embodiment of the present invention.

Referring to FIG. 9, a lamination device used in the method of manufacturing a display device according to an embodiment of the present invention may have a light refraction part TM-1 having a convex lens shape. For example, the light refraction part TM-1 may have a flat portion adjacent to a light source LE and a convex portion adjacent to a window fixing chuck WJ. For example, the flat portion may face the light source LE, and the convex portion may face the window fixing chuck WJ. The light refraction part TM-1 may refract light emitted from the light source LE toward a guide film GF (see FIG. 6). For example, the light emitted from the light source LE may cure the curved corner portion of the guide film LGF while passing through the light refraction part TM-1. As a result, in the later operation of removing the pressing part PD-1 from the window fixing chuck WJ (S1300), the cured guide film LGF may be easily removed from a display panel DP.

Figure 10:
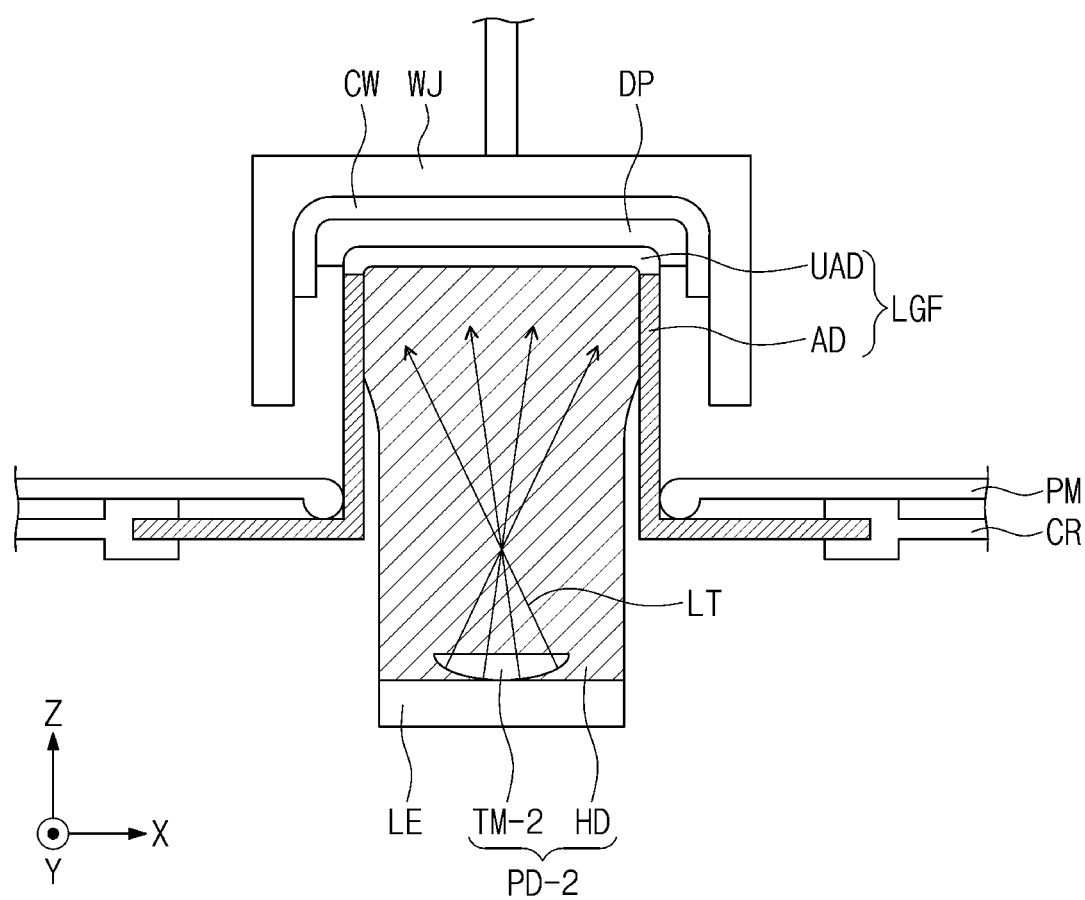
FIG. 10 is a schematic view illustrating an operation of a method of manufacturing a display device according to an embodiment of the present invention.

Referring to FIG. 10, a lamination device used in the method of manufacturing a display device according to an embodiment of the present invention may have a light refraction part TM-2 having a concave lens shape. For example, the light refraction part TM-2 may have a concave portion adjacent to a light source LE and a flat portion adjacent to a window fixing chuck WJ. For example, the concave portion may face the light source LE, and the flat portion may face the window fixing chuck WJ. The light refraction part TM-2 may refract light emitted from the light source LE toward a guide film GF (see FIG. 6). For example, the light emitted from the light source LE may cure the curved corner portion of the guide film LGF while passing through the light refraction part TM-2. As a result, in the later operation of removing the pressing part PD-2 from the window fixing chuck WJ (S1300), the cured guide film LGF may be easily removed from a display panel DP.

Figure 11:
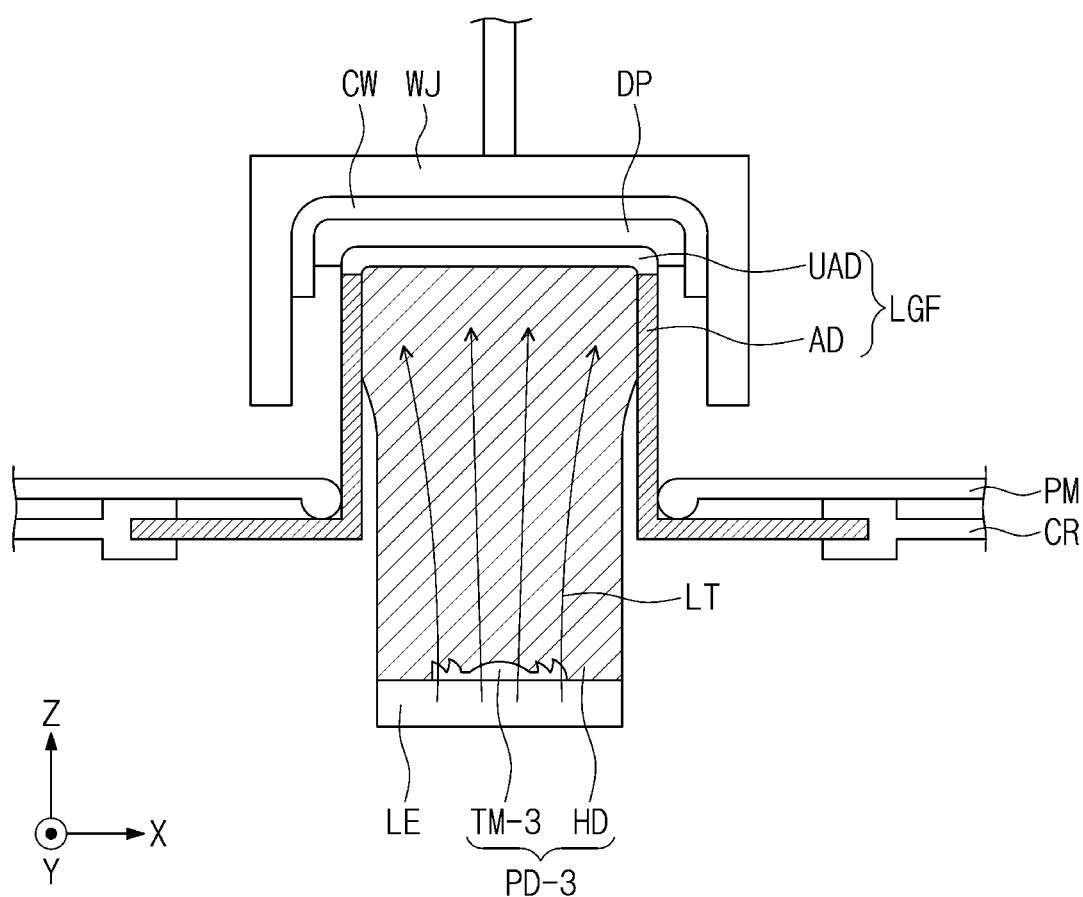
FIG. 11 is a schematic view illustrating an operation of a method of manufacturing a display device according to an embodiment of the present invention.

Referring to FIG. 11, a lamination device used in the method of manufacturing a display device according to an embodiment of the present invention may have a light refraction part TM-3 having a Fresnel lens shape. For example, the light refraction part TM-3 may have a flat portion adjacent to a light source LE and a convex portion adjacent to a window fixing chuck WJ. For example, the flat portion may face the light source LE, and the convex portion may face the window fixing chuck WJ. The light refraction part TM-3 may refract light emitted from the light source LE toward a guide film GF (see FIG. 6). For example, the light emitted from the light source LE may cure the curved corner portion of the guide film LGF while passing through the light refraction part TM-3. As a result, in the later operation of removing the pressing part PD-3 from the window fixing chuck WJ (S1300), the cured guide film LGF may be easily removed from a display panel DP.

In addition, the light refraction part TM-3 may have a split form in a X axis direction X. The volume of the light refraction part TM-3 occupied in the head part HD may be relatively small. Accordingly, a strain of the head part HD may increase, and lamination reliability between the display panel DP and the window CW may be increased in the operation of pressing a target panel with a pressing part toward a window CW (S900).

A lamination device according to an embodiment of the present invention may include a light source, a pressing part including a light refraction part disposed on the light source and a head part, and a window fixing chuck disposed on the pressing part. Light emitted from the light source may be refracted toward the window fixing chuck while passing through the light refraction part, and may be emitted toward the window fixing chuck after passing through the head part. Accordingly, the lamination device according to an embodiment of the present invention may irradiate a display panel with the light while in a state in which a window and a display panel are pressed, thereby simplifying a lamination process for the window and the display panel.

A method of manufacturing a display device according to an embodiment of the present invention includes pressing a target panel with a pressing part toward a window, and then emitting light toward a guide film by a light source. Accordingly, lamination reliability between the window and the display panel may be increased and a lamination process for the window and the display panel may be simplified.

While the present invention has been described with reference to embodiments thereof, it will be understood by those of ordinary skill in the art that various changes in form and details may be made thereto without departing from the spirit and scope of the present invention.

What is claimed is:

1. A lamination device comprising:
   a stage including a fixing part;
   a pressing part disposed on the stage;
   a light source disposed between the stage and the pressing part, and configured to emit light in a direction of the pressing part; and
   a window fixing chuck overlapping the pressing part,
   wherein the pressing part includes:
      a light refraction part disposed adjacent to the light source and configured to refract the light that was emitted in the direction of the pressing part toward the window fixing chuck; and
      a head part at least partially surrounding the light refraction part, and configured to transmit the light that was refracted toward the window fixing chuck, wherein the head part includes a material different from that of the light refraction part.

2. The lamination device of claim 1, wherein the light has a central wavelength of about 200 nm to about 400 nm.

3. The lamination device of claim 1, wherein the head part comprises silicone.

4. The lamination device of claim 1, wherein the light refraction part comprises glass.

5. The lamination device of claim 1, wherein the light refraction part has a flat shape, a concave lens shape, a convex lens shape, or a Fresnel lens shape.

6. The lamination device of claim 1, wherein the head part is a diaphragm.

7. A lamination device comprises:
   a fixing part configured to fix a guide film;
   a pressing part disposed below the fixing part and the guide film;
   a roller part disposed on the pressing part;
   a light source disposed on the pressing part; and
   a window fixing chuck overlapping the pressing part,
   wherein the pressing part includes:
      a light refraction part refracting light emitted from the light source toward the window fixing chuck; and
      a head part at least partially surrounding the light refraction part and transmitting the refracted light.

8. The lamination device of claim 7, wherein the light emitted from the light source has a central wavelength of about 200 nm to about 400 nm.

9. The lamination device of claim 7, wherein the head part may be configured to extend into the window fixing chuck.

10. The lamination device of claim 7, wherein the light refraction part has a flat shape, a concave lens shape, a convex lens shape, or a Fresnel lens shape.

* * * * *